(12) United States Patent
Ohlsson (10) Patent No.: US 11,047,725 B2
(45) Date of Patent: Jun. 29, 2021

(54) RADAR LEVEL GAUGE SYSTEM WITH DIELECTRIC ANTENNA

(71) Applicant: Rosemount Tank Radar AB, Mölnlycke (SE)

(72) Inventor: Magnus Ohlsson, Norsholm (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 363 days.

(21) Appl. No.: 15/963,587

(22) Filed: Apr. 26, 2018

(65) Prior Publication Data

US 2019/0331518 A1   Oct. 31, 2019

(51) Int. Cl.
*G01S 13/88* (2006.01)
*G01F 23/284* (2006.01)
*H01Q 1/22* (2006.01)

(52) U.S. Cl.
CPC ........... *G01F 23/284* (2013.01); *G01S 13/88* (2013.01); *H01Q 1/225* (2013.01)

(58) Field of Classification Search
CPC ....... G01F 23/284; G01S 13/88; H01Q 19/08; H01Q 1/1214; H01Q 1/225
See application file for complete search history.

(56) References Cited

U.S. PATENT DOCUMENTS

| | | | |
|---|---|---|---|
| 6,614,391 B1 * | 9/2003 | Burger | G01F 23/284 342/124 |
| 7,952,514 B2 | 5/2011 | Nilsson | |
| 8,242,965 B2 | 8/2012 | Gerding et al. | |
| 8,477,064 B2 | 7/2013 | Nilsson | |
| 8,688,279 B2 | 4/2014 | Nilsson | |
| 8,711,049 B2 | 4/2014 | Fehrenbach et al. | |
| 8,970,395 B2 | 3/2015 | Nilsson | |

(Continued)

FOREIGN PATENT DOCUMENTS

| CN | 206488831 U | 9/2017 |
|---|---|---|
| DE | 19617963 A1 | 11/1997 |

OTHER PUBLICATIONS

Notification of Transmittal of the International Search Report and the Written Opinion of the International Searching Authority from PCT/EP2019/059541, dated Jul. 8, 2019.

*Primary Examiner* — Timothy A Brainard
(74) *Attorney, Agent, or Firm* — Westman, Champlin & Koehler, P.A.

(57) ABSTRACT

A radar level gauge system, comprising a transceiver; an antenna arrangement configured to transmit an electromagnetic transmit signal from the transceiver, and to return an electromagnetic reflection signal resulting from reflection of the transmit signal at a surface of the product back towards the transceiver; and processing circuitry. The antenna arrangement comprises: a dielectric antenna body having a transmit signal receiving surface to receive the transmit signal from the transceiver, a convex transmit signal emitting surface configured to direct the transmit signal towards the product following passage of the transmit signal through the dielectric antenna body, and a side surface connecting the transmit signal receiving surface and the transmit signal emitting surface; and an electrically conductive antenna housing covering at least a portion of the side surface of the dielectric antenna body. The dielectric antenna body is arranged to conductively separate the transceiver from the conductive antenna housing.

18 Claims, 7 Drawing Sheets

(56) References Cited

U.S. PATENT DOCUMENTS

| | | | |
|---|---|---|---|
| 2003/0151560 A1* | 8/2003 | Kienzle | A61P 37/02 343/786 |
| 2007/0028829 A1 | 2/2007 | Griessbaum et al. | |
| 2009/0033544 A1* | 2/2009 | Duivenvoorden | G01F 23/284 342/124 |
| 2010/0123615 A1* | 5/2010 | Fehrenbach | H01Q 19/08 342/124 |
| 2014/0111371 A1* | 4/2014 | Edvardsson | G01S 13/88 342/124 |
| 2016/0041023 A1* | 2/2016 | Ito | H01Q 1/225 342/124 |
| 2016/0290850 A1* | 10/2016 | Kech | G01F 23/284 |
| 2017/0077601 A1 | 3/2017 | Linkies et al. | |
| 2018/0113020 A1 | 4/2018 | Fredriksson et al. | |

* cited by examiner

RADAR LEVEL GAUGE SYSTEM WITH DIELECTRIC ANTENNA

TECHNICAL FIELD OF THE INVENTION

The present invention relates to a radar level gauge system with a dielectric antenna.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe. The probe is generally arranged to extend vertically from the top towards the bottom of the tank.

An electromagnetic transmit signal is generated by a transceiver and propagated towards the surface of the product in the tank, and an electromagnetic reflection signal resulting from reflection of the transmit signal at the surface is propagated back towards to the transceiver.

Based on a relation between the transmit signal and the reflection signal, the distance to the surface of the product can be determined.

For some applications, such as for non-contact radar level gauge systems using microwave signals in a relatively high frequency band, dielectric antennas of the so-called illuminated ellipsoid type may be particularly suitable. Such dielectric antennas can be made relatively compact, which may facilitate installation at various tanks.

An example of a dielectric antenna is described by U.S. Pat. No. 8,242,965.

Radar level gauge systems are ubiquitous in application areas involving handling, shipping and storing of products as well as, for example, in the chemical process industry.

Since products to be monitored and/or measured are often flammable, special safety requirements exist for equipment, such as radar level gauge systems or at least parts thereof that are positioned within a so-called hazardous area. Such equipment generally needs to be certified as explosion-proof or intrinsically safe.

For instance, the radar level gauge system may need to be designed to ensure sufficient electrical isolation between the measurement electronics and any metallic surface that may come into contact with the product in the tank.

SUMMARY

In view of the above, a general object of the present invention is to provide an improved radar level gauge system comprising a dielectric antenna.

According to a first aspect of the present invention, it is therefore provided a radar level gauge system, for determining a filling level of a product in a tank, the radar level gauge system comprising: a transceiver for generating, transmitting and receiving electromagnetic signals; an antenna arrangement configured to radiate an electromagnetic transmit signal from the transceiver towards the product in the tank, and to return an electromagnetic reflection signal resulting from reflection of the transmit signal at a surface of the product back towards the transceiver; and processing circuitry for determining the filling level based on the transmit signal and the reflection signal, wherein the antenna arrangement comprises: a dielectric antenna body having a transmit signal receiving surface to receive the transmit signal from the transceiver, a convex transmit signal emitting surface configured to direct the transmit signal towards the product following passage of the transmit signal through the dielectric antenna body, and a side surface connecting the transmit signal receiving surface and the transmit signal emitting surface; and an electrically conductive antenna housing covering at least a portion of the side surface of the dielectric antenna body, wherein the dielectric antenna body is arranged to conductively separate the transceiver from the conductive antenna housing.

The dielectric antenna body may be made of any suitable dielectric material. One example of such a suitable dielectric material may be PTFE (polytetrafluoroethylene). As one of ordinary skill in the art or radar level gauging will be aware, there are many other suitable dielectric materials that may be preferable to use in the antenna body, depending on the application.

The electrically conductive antenna housing does not need to completely cover the the side surface of the dielectric antenna body, for instance, the electrically conductive antenna housing may be configured as a grid or a mesh, and still fulfil the desired electrical functionality.

The "transceiver" may be one functional unit capable of transmitting and receiving electromagnetic signals, or may be a system comprising separate transmitter and receiver units.

It should be noted that the processing circuitry may be provided as one device or several devices working together.

The electromagnetic transmit signal may advantageously be a microwave signal. For instance, the transmit signal may be frequency and/or amplitude modulated on a carrier in the microwave frequency range.

An example center frequency of the electromagnetic transmit signal may be at least 60 GHz. Advantageously, the center frequency may be about 80 GHz.

By "conductively separate" the transceiver from the conductive antenna housing should be understood to prevent flow of charge between the transceiver and the conductive antenna housing. An equivalent expression that is sometimes used is "galvanically separate".

The present invention is based on the realization that the dielectric antenna body can be used to achieve the desired conductive separation between the transceiver and the interior of the tank.

This provides for a very short waveguide chain from the signal launcher/feeder emitting the transmit signal, which is in turn beneficial for the near zone performance of the radar level gauge system. In addition, the conductive separation can be achieved in a cost-efficient and robust manner.

For practically all radar level gauge system installations, the maximum possible voltage that may be present in the feeding circuits of the radar level gauge system is 375 V (1.5 times nominal 250 VAC) at 50-60 Hz. In a worst case scenario, this is the voltage that could possibly be present between a conductive part of the transceiver closest to the dielectric antenna body, and the conductive antenna housing (which is typically grounded).

According to embodiments, the dielectric antenna body may advantageously be configured to conductively separate the transceiver from the conductive antenna housing (and thus from other conductive structures at the tank, such as the tank itself) by a distance sufficient for providing infallible separation for the above-mentioned maximum possible voltage.

Many electrical systems in industrial applications are used in areas where explosive gases or highly flammable products normally occur. Oil refineries, storage plants for petroleum products and most chemical plants are obvious examples. Fire or explosion in the wrong place could cause a disaster and most countries have since several decades or more made it mandatory for all users (companies etc.) to fulfill a number of laws/rules to strongly decrease the possibility of such a calamity. Depending on application, a few different degrees of protection are standardized as minimum and for electrical measuring or monitoring devices the protection method "intrinsic safety" is generally used. Component development has made such units working at much lower power than was used in older instruments, which simplifies protection. Intrinsic safety means that only very low power (incl. low voltage and current) is allowed to enter hazardous areas and suitable authorities can after investigation and tests verify that a certain equipment fulfill requirements for intrinsic safety. In that case, units manufactured like the tested units are legally allowed to carry corresponding marking. The rules apply both to circuits located in a hazardous area and circuits used to feed power and signals to parts located in a hazardous area. In the full system there is a border between circuits allowed to be in the hazardous area as "intrinsic safe units" and connection circuits (called "associated intrinsically safe units") necessary to create the safety conditions but which are not allowed to be in the hazardous area. Very roughly, intrinsic safety means that maximum values around 20V/50 mA are allowed to enter hazardous areas so only low power devices can be classified as intrinsically safe. Expressed in another way, spark energies below 20 µJ have been found to be unable to cause ignition of any air/hydrogen mixture even under the worst combination of parameters. Of all flammable substances hydrogen is most easy to ignite by a spark. Arbitrary short circuits or broken wires in an intrinsically safe equipment located in a hazardous area cannot cause any ignition even under worst parameter combinations and that must be valid even if one or two "faults" in the circuits are present.

Examples of rules are IEC60079-0 (general for explosion protection) and IEC60079-11 (rules specific for intrinsic safety). Many national rules (like Factory Mutual and Underwriters in USA, CSA in Canada etc.) exist for intrinsic safety but all basic concepts are the same even if minor details may differ. The ability to create igniting sparks is tested with the same test equipment based on research carried out during the last 50 years and a mixture of hydrogen/air is used as that gas mixture because among flammable gases and liquids it is most easy to be ignited by a spark. To maintain safety function (if not necessarily normal desired function) under one or two faults, critical components are triplicated (like three capacitors connected serially to maintain DC insulation even after two short-circuited capacitors) and the three following types of fault are defined in all norms for intrinsic safety. Practical examples in the table below are from table 5 in IEC60079-11 and apply to separation needed between intrinsically safe circuits and circuits carrying mains power (220-250 V 50/60 Hz with peak values below 375V) or similar voltages:

| Classification of fault possibility below: | Over PCB-surface without coating | Over coated PCB surface | Through solid dielectric material |
|---|---|---|---|
| Minimum insulation distance for separation between intrinsically safe circuits and circuits containing up to 375 V peak. | | | |
| Infallible if distance bigger than | >10 mm | >3.3 mm | >1 mm |
| Countable fault if distance bigger than | >3.3 mm | >1.1 mm | >0.33 mm |
| Uncountable fault if closer than | <3.3 mm | <1.1 mm | <0.33 mm |

One or two "countable faults" in the circuit under test are included in the worst case test but for uncountable faults, any number or combination of such faults are used within what is considered as "normal function" with regard to safety. "Infallible" means that the insulation is considered to remain in any case. The distances in the table above may be slightly different in different norms and different applications but the terms (infallible etc.) are the same. For many other components, the same three classifications (infallible etc.) apply but the criteria are more complicated than those in the table above and may include test procedures and design details for good quality. Any change in future production (changed component etc.) needs a formal approval for intrinsically safe equipment.

In these embodiments, infallible separation between the transceiver and the conductive antenna housing may advantageously be achieved by configuring the dielectric antenna body to separate the conductive part of the transceiver closest to the dielectric antenna body from the conductive antenna housing by a minimum of at least 1 mm of dielectric antenna body material.

According to various embodiments of the present invention, the transceiver may comprise an electrically conductive microwave signal propagating structure for transmitting the transmit signal; and a portion of the dielectric antenna body may be arranged between the electrically conductive microwave signal propagating structure and the electrically conductive antenna housing to conductively separate the microwave signal propagating structure and the antenna housing. In these embodiments, the above-mentioned conductive part of the transceiver closest to the dielectric antenna body may be (a portion of) the microwave signal propagating structure.

To conveniently achieve the conductive separation between the transceiver (the microwave signal propagating structure) and the conductive antenna housing, the dielectric antenna body may advantageously have a recess; and the microwave signal propagating structure may be at least partly arranged in the recess.

In embodiments of the radar level gauge system of the present invention, the bottom of the recess in the dielectric antenna body may at least partly form the above-mentioned transmit signal receiving surface.

In some embodiments, the recess in the dielectric antenna body may be configured to accommodate the entire transceiver.

In embodiments, the microwave signal propagating structure may comprise a hollow waveguide having an end facing the transmit signal receiving surface of the dielectric antenna body.

The end of the hollow waveguide facing the transmit signal receiving surface may advantageously be in direct abutment with the transmit signal receiving surface of said dielectric antenna body. In this manner, the dielectric antenna body can synergistically fulfil the dual function of accurately positioning the hollow waveguide in relation to the dielectric antenna body, and conductively separate the hollow waveguide (and thus the transceiver) from the conductive antenna housing.

According to various embodiments, furthermore, the hollow waveguide may comprise a flaring portion, flaring towards the transmit signal receiving surface of the dielectric antenna body. The flaring portion may act as a horn to provide a gradual impedance transition between the hollow waveguide and the dielectric antenna body.

To reduce reflection from the end of the hollow waveguide where the microwaves of the transmit signal go from air in the hollow waveguide to the dielectric antenna body, the transmit signal receiving surface of the dielectric antenna body may include a reflection reducing structure.

The reflection reducing structure may advantageously be one of a groove and a ridge formed in the dielectric antenna body. For efficient reflection reduction, the vertical extension (depth if a groove and height if a ridge) of the reflection reducing structure may advantageously correspond to about a quarter of a wavelength of the transmit signal at a center frequency of the transmit signal.

The reflection reducing structure may extend at least partly across a projection of the end of the hollow waveguide on the transmit signal receiving surface.

According to various embodiment of the radar level gauge system of the present invention, the dielectric antenna body may comprise a circumferential rim portion. The circumferential rim portion may be extending axially and surrounding the transmit signal receiving surface to form a kind of bucket shape, with the transmit signal receiving surface being located inside the "bucket".

Advantageously, the conductive antenna housing may be formed by a tubular metallic member having an inside with a frustoconical segment; and the radar level gauge system may comprise a mounting member arranged to radially press the circumferential rim portion of the dielectric antenna body towards the inside of the tubular metallic member, in the frustoconical segment thereof. With this configuration, the preferably plastic material of the circumferential rim portion can deform and flow somewhat to provide an efficient seal between the conductive antenna housing and the dielectric antenna body. Hereby, an efficient and convenient process sealing can be achieved. The mounting member, which may have a frustoconical segment dimensioned to fit with the frustoconical segment of the dielectric antenna body, may advantageously be urged towards the circumferential rim portion of the dielectric antenna body by an axially directed spring force.

To facilitate sealing deformation and/or flow of material in the circumferential rim portion of the dielectric antenna body, the inside of the conductive antenna housing may exhibit at least one circumferential edge in the frustoconical segment.

According to a second aspect of the present invention, it is provided a tank arrangement comprising: a tank for accommodating a product, the tank having an electrically conductive mounting structure; and a radar level gauge system attached to the conductive mounting structure of the tank for determining a filling level of the product in the tank, the radar level gauge system comprising: a transceiver for generating, transmitting and receiving electromagnetic signals; an antenna arrangement configured to radiate an electromagnetic transmit signal from the transceiver towards the product in the tank, and to return an electromagnetic reflection signal resulting from reflection of the transmit signal at a surface of the product back towards the transceiver; and processing circuitry for determining the filling level based on the transmit signal and the reflection signal, wherein the antenna arrangement comprises: a dielectric antenna body having a transmit signal receiving surface to receive the transmit signal from the transceiver, a convex transmit signal emitting surface configured to direct the transmit signal towards the product following passage of the transmit signal through the dielectric antenna body, and a side surface connecting the transmit signal receiving surface and the transmit signal emitting surface, wherein the dielectric antenna body is arranged to conductively separate the transceiver from the conductive mounting structure.

In embodiments of the second aspect of the present invention, the antenna arrangement does not necessarily need to comprise an electrically conductive antenna housing covering at least a portion of the side surface of the dielectric antenna body. In such and other embodiments, the antenna arrangement may advantageously comprise a microwave absorbing structure at the side surface of the dielectric antenna body. Advantageously, the microwave absorbing structure may be integrally formed with the dielectric antenna body. For instance, the microwave absorbing structure may be sintered to the side surface of the dielectric antenna body.

The purpose of the microwave absorbing structure is to reduce the occurrence of unwanted side lobes.

In summary, aspects of the present invention thus relate to a radar level gauge system, comprising a transceiver; an antenna arrangement configured to transmit an electromagnetic transmit signal from the transceiver, and to return an electromagnetic reflection signal resulting from reflection of the transmit signal at a surface of the product back towards the transceiver; and processing circuitry. The antenna arrangement comprises: a dielectric antenna body having a transmit signal receiving surface to receive the transmit signal from the transceiver, a convex transmit signal emitting surface configured to direct the transmit signal towards the product following passage of the transmit signal through the dielectric antenna body, and a side surface connecting the transmit signal receiving surface and the transmit signal emitting surface; and an electrically conductive antenna housing covering at least a portion of the side surface of the dielectric antenna body. The dielectric antenna body is arranged to conductively separate the transceiver from the conductive antenna housing.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

In the present detailed description, various embodiments of the radar level gauge system according to the present invention are mainly discussed with reference to a battery-powered radar level gauge system with wireless communication capabilities.

It should be noted that this by no means limits the scope of the present invention, which equally well includes, for example, radar level gauge systems that are not included in a process management system or radar level gauge systems that are loop-powered or powered with dedicated power lines.

Figure 1:
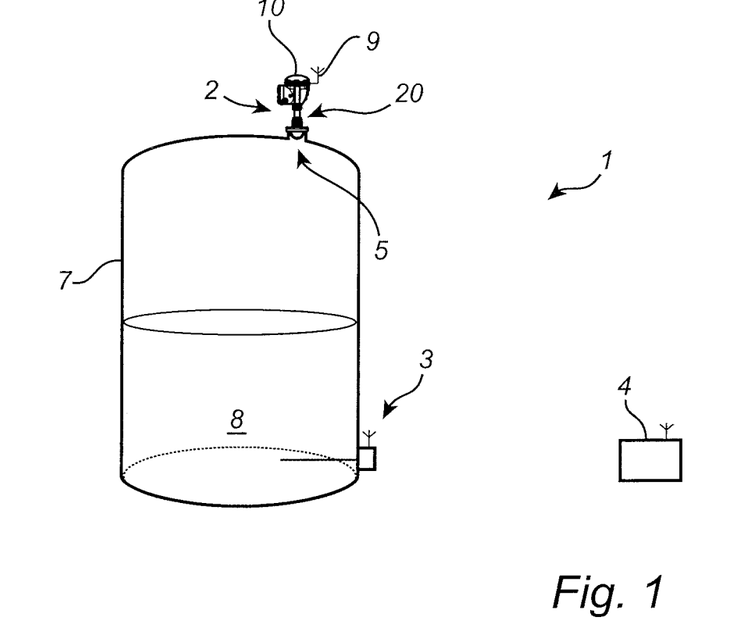
FIG. 1 schematically shows a process monitoring system comprising a radar level gauge system according to an example embodiment of the present invention.

FIG. 1 schematically shows a process monitoring system 1 comprising a plurality of field devices, including an example embodiment of a radar level gauge system 2 and a temperature sensing device 3 wirelessly connected to a host system 4. The radar level gauge system 2 comprises a measurement electronics unit 10 arranged on an outside of the tank 7, an antenna arrangement 5 at least partly arranged on an inside the tank 7, and a feed-through 20 connecting the measurement electronics unit 10 with the antenna arrangement 5.

The radar level gauge system 2 and the temperature sensor 3 are both arranged on a tank containing a product 8 to be gauged.

To reduce the energy consumption of the radar level gauge system 2, at least parts of the radar level gauge system may be operated intermittently and energy may be stored during inactive or idle periods to be used during active periods.

Solutions for intermittent operation and energy storage are, for example, described in U.S. Pat. Nos. 7,952,514, 8,477,064 and U.S. Ser. No. 12/603,048, each of which is hereby incorporated by reference in its entirety.

Figure 2:
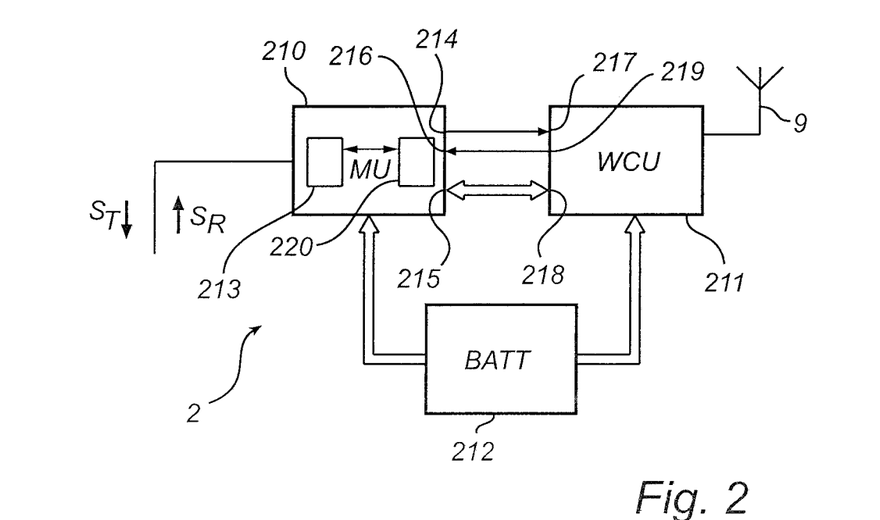
FIG. 2 is a block diagram schematically illustrating the radar level gauge system in FIG. 1.

With reference to FIG. 2, the radar level gauge system 2 in FIG. 1 comprises a measurement unit (MU) 210, a wireless communication unit (WCU) 211 and a local energy store in the form of a battery 212. The wireless communication unit 211 may advantageously be compliant with WirelessHART (IEC 62591). As is schematically indicated in FIG. 2, the MU 210 comprises a transceiver 213 and a measurement processor 220. The transceiver 213 is controllable by the measurement processor 220 for generating, transmitting and receiving electromagnetic signals having frequencies defining a frequency bandwidth, such as 24 GHz to 27 GHz. the measurement processor 220 is coupled to the transceiver 213 for determining the filling level in the tank 7 based on a relation between the transmit signal $S_T$ and the reflection signal $S_R$.

As is schematically indicated in FIG. 2, the measurement unit 210 comprises a first output 214, a second output 215, and a first input 216. The first output 214 is connected to a first input 217 of the wireless communication unit 211 through a first dedicated discreet line, the second output 215 is connected to a second input 218 of the wireless communication unit 211, and the first input 216 is connected to a first output 219 of the wireless communication unit 211 through a second dedicated discreet line. The second output 215 of the measurement unit 210 and the second input 218 of the wireless communication unit 211 may be configured to handle bidirectional data communication according to a serial or a parallel communication protocol to allow exchange of data between the measurement unit 210 and the wireless communication unit 211. The communication between the measurement unit 210 and the wireless communication unit 211 using the different inputs/outputs is described in more detail in U.S. patent application Ser. No. 13/537,513, which is hereby incorporated by reference in its entirety.

The above example of a wireless and locally powered configuration is intended to give the skilled person a detailed example of how various aspects and embodiments of the radar level gauge system according to the present invention can be implemented. It should, however, be noted that there are many other ways of powering and interfacing a radar level gauge system. Such other ways are widely accessible to one of ordinary skill in the art and can be implemented without excessive experimentation or undue burden.

Figure 3:
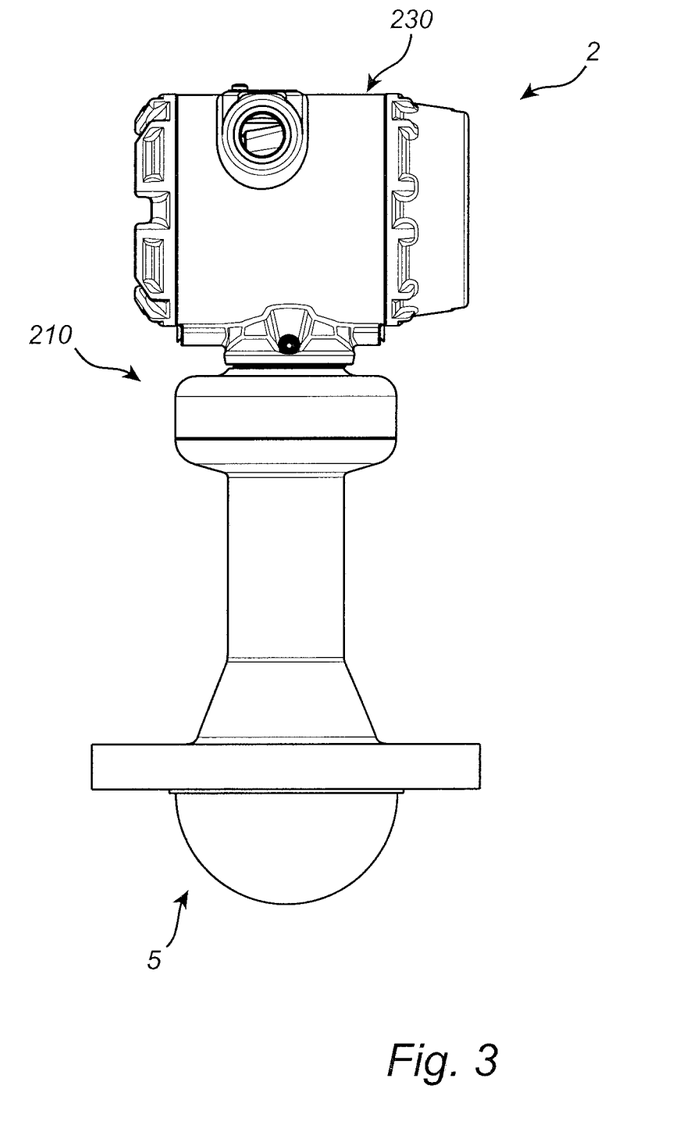
FIG. 3 is a schematic side view of a first embodiment of the radar level gauge system in FIG. 1.

FIG. 3 is a side view of a first embodiment of the radar level gauge system 2 in FIG. 1. Referring to FIG. 3, the radar level gauge system 2 comprises measurement unit 210, communication unit 230, and antenna arrangement 5. Referring to the description provided above in relation to FIG. 1 and FIG. 2, the measurement unit 210 comprises the transceiver 213, the measurement processor 220, and the feed-through 20; and the communication unit 230 comprises the wireless communication unit 211 and the battery 212.

The feed-through may advantageously form part of an explosion-proof enclosure, and, as will be described in more detail further below, the antenna galvanically separates the transceiver 213 from the interior of the tank to provide intrinsic safety, and additionally provides a sealing connection to the interior of the tank 7.

In the following, the antenna arrangement 5, and the galvanic separation and sealing provided by the antenna arrangement 5 will be described in greater detail with reference to FIGS. 4A-C.

First, an embodiment of the antenna arrangement 5 will be described with reference to the exploded view of the antenna arrangement 5 in FIG. 4A, and FIG. 4B. Thereafter, the assembled antenna arrangement 5, and the galvanic separation and sealing provided by the antenna arrangement 5 will be described with reference to FIG. 4C.

Figure 4A:
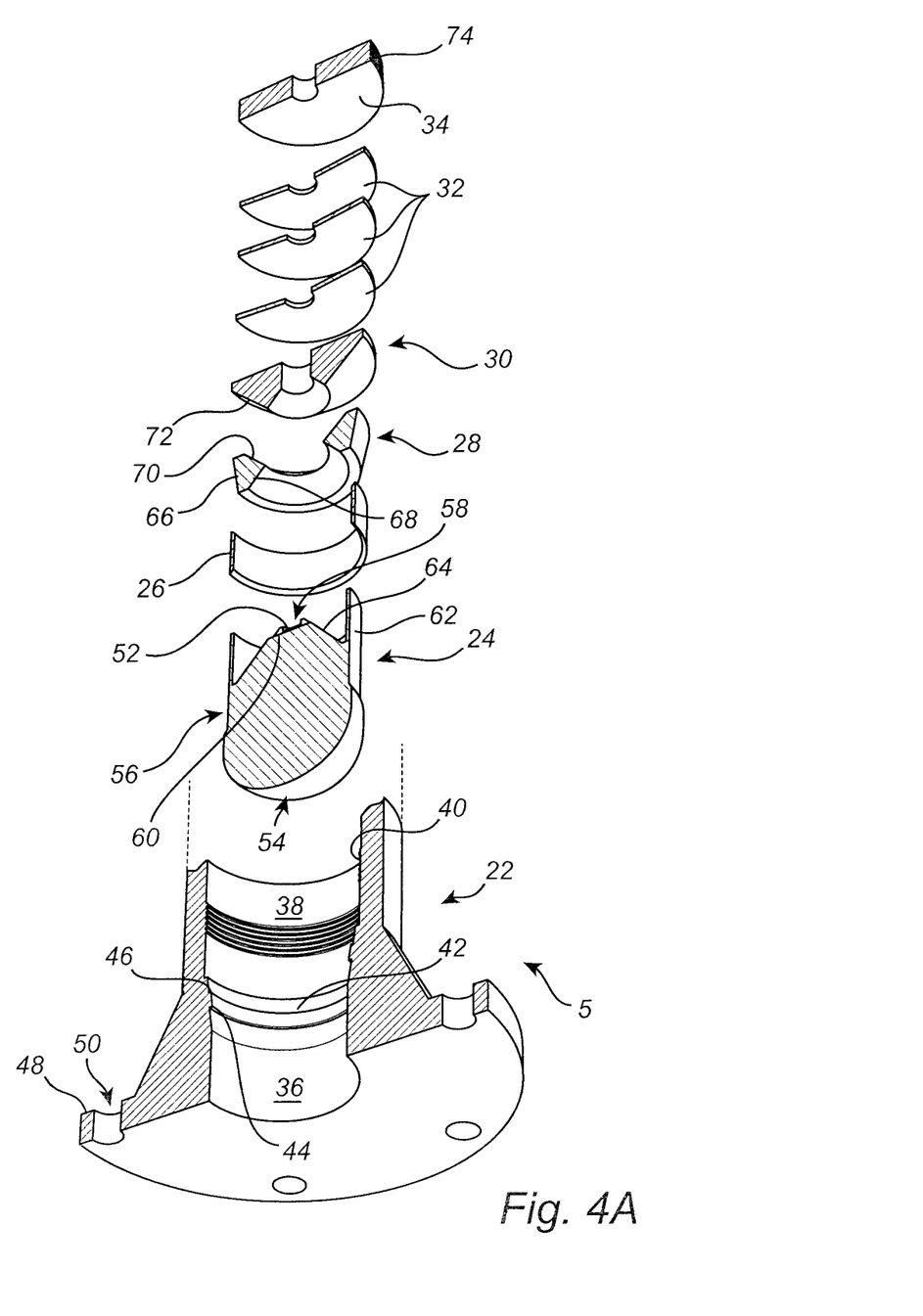
FIGS. 4A-C schematically illustrate the antenna configuration and the conductive separation between the transceiver and the conductive antenna housing in the radar level gauge system in FIG. 3.

Referring to FIG. 4A, an example embodiment of the antenna arrangement 5 comprises an electrically conductive antenna housing 22, a dielectric antenna body 24, a microwave absorbing structure in the form of a sleeve 26 made of carbon-doped PTFE, a mounting member in the form of a clamp ring 28, a clamp cone 30, a spring arrangement 32, and a locking member 34.

The antenna housing 22, the clamp ring 28, the clamp cone 30, the spring arrangement 32, and the locking member 34 may all advantageously be made of a suitable metal, such as stainless steel.

As is schematically indicated in FIG. 4A, the antenna housing 22 is here provided in the form of a tubular metallic member having an inside with a first cylindrical segment 36, a second cylindrical segment 38 with an internal thread 40, and a frustoconical segment 42 between the first 36 and second 38 cylindrical segments. As is shown in FIG. 4A, the inner surface of the antenna housing 22 is serrated in the frustoconical segment 42 by a first 44 and a second 46 circumferential edge. In the example configuration of the antenna arrangement 5 in FIG. 4A, the antenna housing 22 is provided with a flange 48 with bolt holes 50 for attachment to a corresponding flange on the tank 7. It should be noted that the antenna housing 22 may alternatively be provided with other means for attachment of the antenna arrangement 5 to the tank 7. For instance, in other embodiments, the antenna housing 22 may include a threaded portion instead of the flange and/or the antenna housing may be configured for being welded to the tank 7.

Figure 4B:
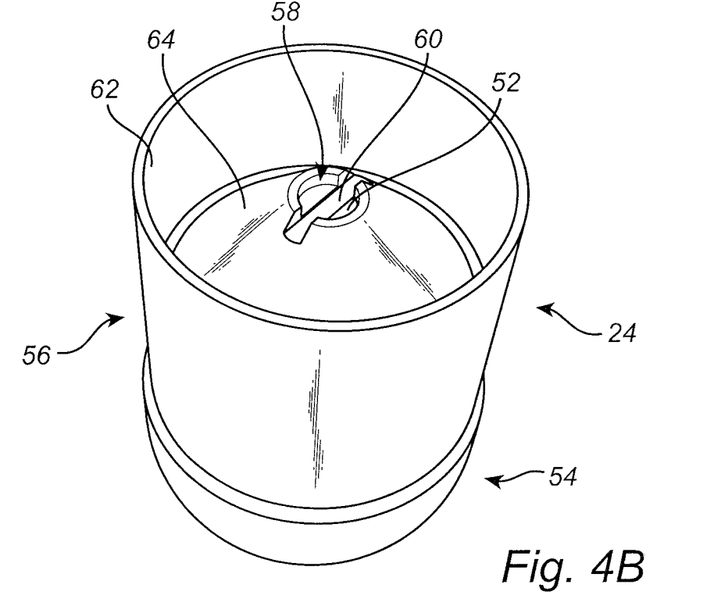

Additionally referring to the perspective view in FIG. 4B, the dielectric antenna body 24, which is dimensioned to fit in the first cylindrical segment 36 of the antenna housing 22, has a transmit signal receiving surface 52, a convex transmit signal emitting surface 54, and a side surface 56 connecting the transmit signal receiving surface 52 and the convex transmit signal emitting surface 54. The transmit signal receiving surface is in a recess 58 in the dielectric antenna body 24, and as is best seen in FIG. 4B, a reflection reducing structure, here in the form of a quarter wavelength deep groove 60 in the dielectric antenna body 24, is provided to reduce reflection at the transmit signal receiving surface 52. With continued reference to FIG. 4A and FIG. 4B, the dielectric antenna body 24 comprises a circumferential rim portion 62 that extends axially and surrounds the transmit signal receiving surface 52, which is at the top of a frustoconical portion 64 of the dielectric antenna body 24.

As is schematically shown in FIG. 4A, the clamp ring 28 has a an outer frustoconical surface 66, a first inner frustoconical surface 68, and a second inner frustoconical surface 70. The outer frustoconical surface 66 is dimensioned to correspond to the general cone angle of the frustoconical segment 42 of the antenna housing 22, the first inner frustoconical surface 68 is dimensioned to fit with the frustoconical portion 64 of the dielectric antenna member 24, and the second outer frustoconical surface 70 is shaped for interaction with the outer frustoconical surface 72 of the clamp cone 30.

By turning the locking member 34 so that the external thread 74 on the locking member 34 interacts with the internal thread 40 in the second cylindrical segment 38 of the antenna housing 22, the spring arrangement 32 can be compressed so that a spring force acts axially on the clamp cone 30. Due to the shapes of the different conical portions of the clamp cone 30, the clamp ring 28, the dielectric antenna body 24, and the antenna housing 22, the circumferential portion 62 of the dielectric antenna member 24 can be radially pressed between the clamp ring 28 and the serrated inner surface of the frustoconical segment 42 of the antenna housing 22. Hereby, the dielectric antenna body 24 is held in place, and a tank seal is provided by the circumferential portion 62 of the dielectric antenna body 24.

Figure 4C:
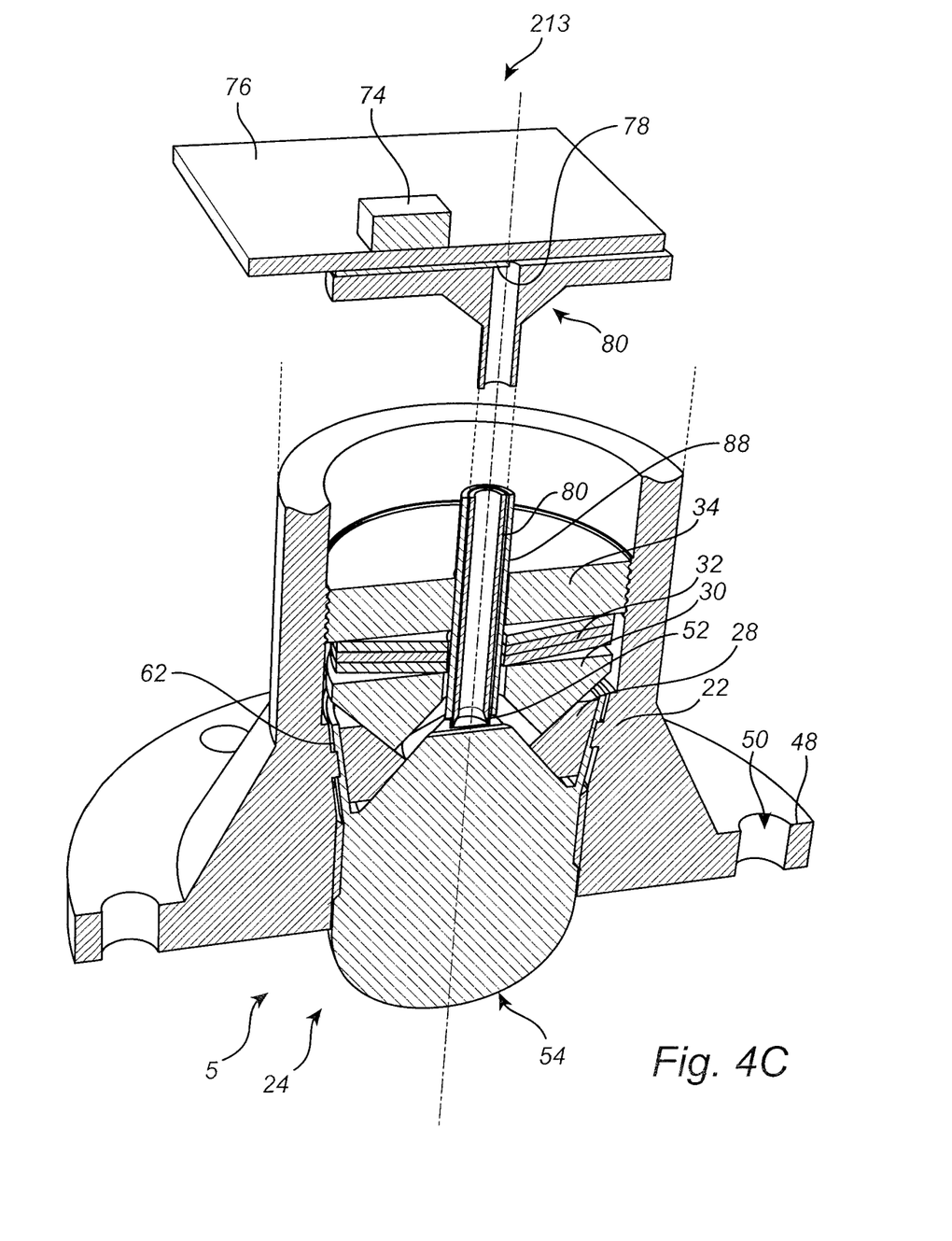

FIG. 4C schematically shows the assembled antenna arrangement 5, and additionally illustrates the transceiver 213, and the galvanic separation between the interior of the tank 7 (represented by the conductive antenna housing 22) and the transceiver provided by the dielectric antenna body 24.

In FIG. 4C, the transceiver 213 is schematically shown to include transceiver circuitry 74 on a circuit board 76, a microwave signal launching structure, here in the form of a conductor patten 78 on the circuit board 76, and an electrically conductive microwave signal propagating structure, here in the form of an air waveguide 80. The top portion of the air waveguide 80 supports the circuit board 76 and receives the transmit signal launched by the conductor pattern 78 on the circuit board 76. The guiding portion of the air waveguide 80 guides the transmit signal towards the signal receiving surface 52 of the dielectric antenna body 24, and the flaring portion of the air waveguide 80, which is in direct abutment with the transmit signal receiving surface 52 in the recess 58 at the top of the dielectric antenna body, directs the energy of the transmit signal towards the signal receiving surface 52 of the dielectric antenna body 24.

As can be seen in FIG. 4C, the circumferential rim portion 62 of the dielectric antenna body 24 has been plastically deformed to provide a seal between the antenna housing 22 and the clamp ring 30.

Further, the transceiver 213, in particular the air waveguide 80 is galvanically separated from the antenna housing 22 by the dielectric antenna body 24 and by a dielectric separation member, here in the form of a dielectric sleeve 88 arranged between the air waveguide 80 and the clamp ring 28, the clamp cone 30, the springs 32 and the locking member 34.

Figure 5:
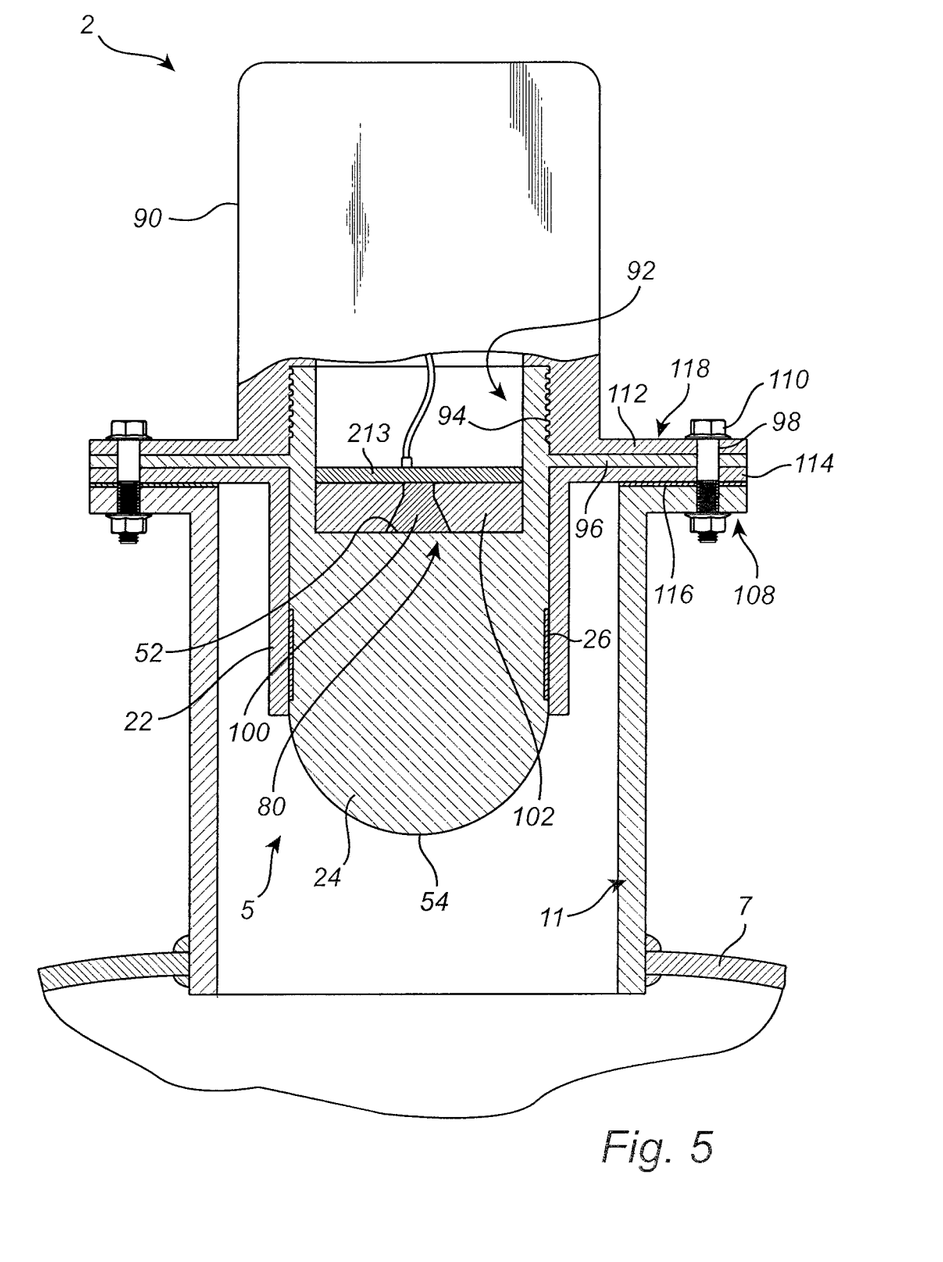
FIG. 5 is a partly cut-out side view of a second embodiment of the radar level gauge system in FIG. 1.

FIG. 5 is a partly cut-out side view of a second embodiment of the radar level gauge system 2 in FIG. 1. Referring to FIG. 5, the radar level gauge system 2 is attached to an electrically conductive mounting structure 11, in the form of a so-called nozzle extending vertically from the roof of the tank 7.

The radar level gauge system 2 comprises a transceiver 213, communication circuitry enclosed in a housing 90, and an antenna arrangement 5. As is schematically indicated in FIG. 5, the antenna arrangement 5 comprises an electrically conductive antenna housing 22, a dielectric antenna body 24, and a microwave absorbing structure, here in the form of a sleeve 26 made of carbon-doped PTFE.

The dielectric antenna body 24 comprised in the radar level gauge system 2 in FIG. 5, according to the second embodiment of the invention, mainly differs from the dielectric antenna body 24 described above in connection with FIG. 3, in the configuration of the recess 58 and structures for fixing the dielectric antenna body 24 to the rest of the radar level gauge system 2, and to the tank 7.

As is schematically indicated in FIG. 5, the transceiver 213 and the microwave signal propagating structure (air waveguide) 80 are both accommodated by the recess 58 in the dielectric antenna body 24, and the dielectric antenna body 24 thereby conductively separates the transceiver and the microwave signal propagating structure 80 from the conductive antenna housing 22, and from the tank 7 (the mounting structure 11). Furthermore, the dielectric antenna body 24 comprises a housing fastening portion 92, including a thread 94, for attachment of the dielectric antenna body 24 to the housing 90, and a tank fastening portion 96, including bolt holes 98, for attachment to the mounting structure 11.

Referring to FIG. 5, the microwave signal propagating structure is formed by a flaring through-hole 100 formed in a metal plate 102, so that the through-hole forms an air waveguide with a horn portion facing the signal receiving portion 52 of the dielectric antenna body 24.

As is schematically indicated in FIG. 5, the antenna arrangement 5 is attached to the housing 90 of the radar level gauge system 2 by bringing the thread 94 of the housing fastening portion 92 of the dielectric antenna body 24 in engagement with a thread of the housing 90, and turning one or both of the housing 90 and the antenna arrangement 5.

When attaching the radar level gauge system 2 in FIG. 5 to the mounting structure 11 of the tank 7, a mounting flange 118 of the radar level gauge system 2 is arranged on a flange 108 of the mounting structure 11, and these flanges are pressed against each other, for example using fasteners 110 as is indicated in FIG. 5. As is also schematically indicated in FIG. 5, the flange of the radar level gauge system 2 comprises a housing flange portion 112, the above-mentioned tank fastening portion 96 of the dielectric antenna body 24, and optionally a flange portion 114 of the conductive antenna housing 22. In embodiments where the flange of the radar level gauge system 2 includes such a flange portion 114 of the conductive antenna housing 22, an elastomeric gasket 116 may be provided for improved sealing.

In alternative embodiments, the microwave absorbing structure may be held in place by other means than the antenna housing 22, and/or the microwave absorbing structure may be an integral part of the dielectric antenna body 24. In such alternative embodiments, the antenna arrangement 5 does not necessarily include the electrically conductive antenna housing 22. The dielectric antenna body 24 may then be arranged and configured to conductively (galvanically) separate the transceiver 213 from conductive mounting structure 11 comprised in the tank 7.

Figure 6:
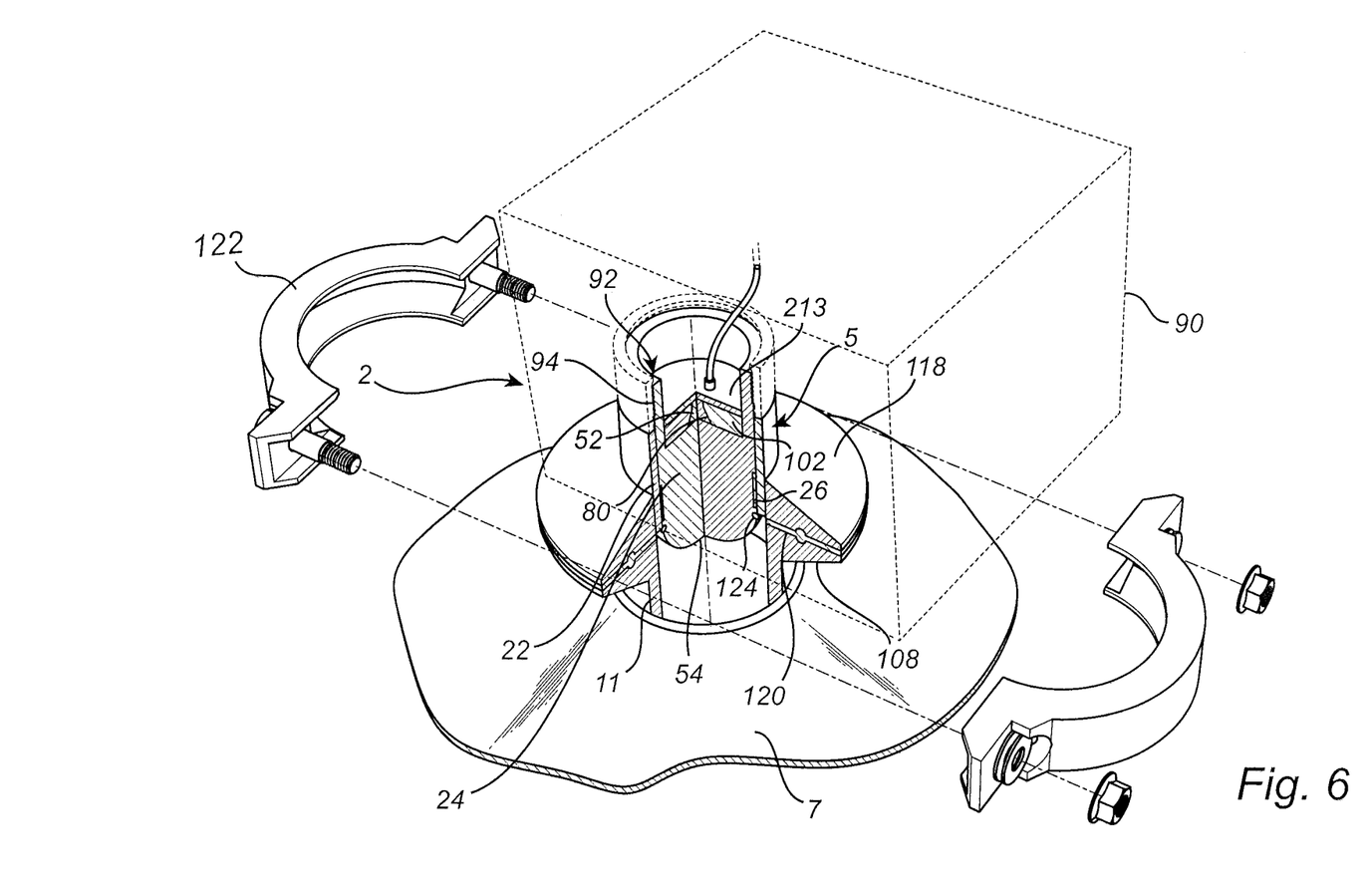
FIG. 6 is a schematic partly cut-out cross-section view of a third embodiment of the radar level gauge system in FIG. 1.

FIG. 6 is a partly cut out perspective view of a third embodiment of the radar level gauge system 2 in FIG. 1. Referring to FIG. 6, the radar level gauge system 2 is attached to an electrically conductive mounting structure 11, in the form of a so-called nozzle extending vertically from the roof of the tank 7.

The radar level gauge system 2 according to the third embodiment in FIG. 6 mainly differs from the radar level gauge system according to the second embodiment in FIG. 5 in that the mounting flange 118 of the radar level gauge system 2 is arranged vertically adjacent to the signal emitting surface 54 of the dielectric antenna body 24.

Through this configuration, the transceiver 213 is further removed from the interior of the tank 7, providing for a lower temperature at the transceiver 213. This may allow use of the third embodiment of the radar level gauge system 2 for higher temperature applications, than the second embodiment of the radar level gauge system 2 in FIG. 5.

To prevent product 8 from leaking between the dielectric antenna body 24 and the conductive antenna housing 22, the radar level gauge system 2 in FIG. 6 comprises a sealing, such as an O-ring 124, arranged in a suitably shaped notch in the dielectric antenna body 24.

In addition, an alternative way of attaching the radar level gauge system 2 to the mounting structure 11 is indicated in FIG. 6. In the configuration of FIG. 6, an elastomeric gasket 120 is arranged betwen the mounting structure flange 108 and the gauge flange 118, and the mounting structure flange 108 and the gauge flange 118 are pressed and held together by a clamp ring 122.

It should, however, be understood that the configuration for attaching the radar level gauge system to the tank described above with reference to FIG. 5 may be applied to the radar level gauge system in FIG. 6, and vice versa.

The person skilled in the art realizes that the present invention by no means is limited to the preferred embodiments described above. On the contrary, many modifications and variations are possible within the scope of the appended claims.

What is claimed is:

1. A radar level gauge system, for determining a filling level of a product in a tank, said radar level gauge system comprising:
    a transceiver for generating, transmitting and receiving electromagnetic signals;
    an antenna arrangement configured to radiate an electromagnetic transmit signal from said transceiver towards said product in the tank, and to return an electromagnetic reflection signal resulting from reflection of said transmit signal at a surface of said product back towards said transceiver; and
    processing circuitry for determining said filling level based on said transmit signal and said reflection signal,
    wherein said antenna arrangement comprises:
    a dielectric antenna body having a transmit signal receiving surface to receive the transmit signal from said transceiver, a convex transmit signal emitting surface configured to direct the transmit signal towards said product following passage of the transmit signal through said dielectric antenna body, and a side surface connecting said transmit signal receiving surface and said transmit signal emitting surface; and
    an electrically conductive antenna housing covering at least a portion of the side surface of said dielectric antenna body,
    wherein:
        said dielectric antenna body is arranged to conductively separate the transceiver from the conductive antenna housing;
        said transceiver comprises a hollow waveguide for transmitting said transmit signal from the transceiver to the transmit signal receiving surface of the dielectric antenna body; and
        a portion of said dielectric antenna body is arranged between said hollow waveguide and said electrically conductive antenna housing to conductively separate the hollow waveguide and the antenna housing.

2. The radar level gauge system according to claim 1, wherein:
    said dielectric antenna body has a recess; and
    said hollow waveguide is at least partly arranged in said recess.

3. The radar level gauge system according to claim 1, wherein an end of said hollow waveguide is in direct abutment with the transmit signal receiving surface of said dielectric antenna body.

4. The radar level gauge system according to claim 1, wherein said hollow waveguide comprises a flaring portion, flaring towards the transmit signal receiving surface of said dielectric antenna body.

5. The radar level gauge system according to claim 1 wherein the transmit signal receiving surface includes a reflection reducing structure.

6. The radar level gauge system according to claim 5, wherein said reflection reducing structure is one of a groove and a ridge formed in said dielectric antenna body.

7. The radar level gauge system according to claim 5, wherein said reflection reducing structure extends at least partly across a projection of the end of said hollow waveguide on the transmit signal receiving surface.

8. The radar level gauge system according to claim 1, wherein said dielectric antenna body comprises a circumferential rim portion extending axially and surrounding said transmit signal receiving surface.

9. The radar level gauge system according to claim 8, wherein:
    said conductive antenna housing is formed by a tubular metallic member having an inside with a frustoconical segment; and
    said radar level gauge system comprises a mounting member arranged to radially press the circumferential rim portion of said dielectric antenna body against the inside of said tubular metallic member, in said frustoconical segment.

10. The radar level gauge system according to claim 9 wherein the inside of said conductive antenna housing exhibits at least one circumferential edge in said frustoconical segment.

11. The radar level gauge system according to claim 1, wherein said transceiver comprises a microwave signal launching structure in the form of a conductor pattern on a substrate.

12. The radar level gauge system according to claim 1, wherein said dielectric antenna body is arranged to separate the transceiver and the conductive housing by at least 0.5 mm of dielectric antenna body material.

13. The radar level gauge system according to claim 1, further comprising a microwave absorbing structure arranged between said dielectric antenna body and said electrically conductive antenna housing.

14. The radar level gauge system according to claim 13, wherein said microwave absorbing structure is provided in the form of a sleeve made of carbon-doped polymer.

15. The radar level gauge system according to claim 1, wherein a center frequency of said transmit signal is higher than 60 GHz.

16. A tank arrangement comprising:
   a tank for accommodating a product, said tank having an electrically conductive mounting structure; and
   a radar level gauge system attached to said conductive mounting structure of the tank for determining a filling level of the product in the tank, said radar level gauge system comprising:
      a transceiver for generating, transmitting and receiving electromagnetic signals;
      an antenna arrangement configured to radiate an electromagnetic transmit signal from said transceiver towards said product in the tank, and to return an electromagnetic reflection signal resulting from reflection of said transmit signal at a surface of said product back towards said transceiver; and
      processing circuitry for determining said filling level based on said transmit signal and said reflection signal,
   wherein said antenna arrangement comprises:
      a dielectric antenna body having a transmit signal receiving surface to receive the transmit signal from said transceiver, and a convex transmit signal emitting surface configured to direct the transmit signal towards said product following passage of the transmit signal through said dielectric antenna body,
   wherein:
      said dielectric antenna body is arranged to conductively separate the transceiver from said conductive mounting structure;
      said transceiver comprises a hollow waveguide for transmitting said transmit signal; and
      a portion of said dielectric antenna body is arranged between said hollow waveguide and a electrically conductive antenna housing to conductively separate the hollow waveguide and the antenna housing.

17. The tank arrangement according to claim 16, wherein said dielectric antenna body has a side surface connecting said transmit signal receiving surface and said transmit signal emitting surface, and said antenna arrangement further comprises the electrically conductive antenna housing covering at least a portion of the side surface of said dielectric antenna body,
wherein said dielectric antenna body is arranged to conductively separate the transceiver from the conductive antenna housing.

18. The tank arrangement according to claim 16, wherein said dielectric antenna body has a side surface connecting said transmit signal receiving surface and said transmit signal emitting surface, and said antenna arrangement further comprises a microwave absorbing structure arranged at the side surface of the dielectric antenna body.

\* \* \* \* \*